(12) United States Patent
Kötting

(10) Patent No.: US 9,938,964 B2
(45) Date of Patent: Apr. 10, 2018

(54) WIND TURBINE HAVING A MEASURING DEVICE

(71) Applicant: SSB Wind Systems GmbH & Co. KG, Saltzbergen (DE)

(72) Inventor: Norbert Kötting, Neuenkirchen (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 323 days.

(21) Appl. No.: 14/782,414

(22) PCT Filed: Mar. 18, 2014

(86) PCT No.: PCT/EP2014/000737
§ 371 (c)(1),
(2) Date: Oct. 5, 2015

(87) PCT Pub. No.: WO2014/173483
PCT Pub. Date: Oct. 30, 2014

(65) Prior Publication Data
US 2016/0040655 A1 Feb. 11, 2016

(30) Foreign Application Priority Data
Apr. 24, 2013 (DE) .................. 10 2013 007 088

(51) Int. Cl.
*F03D 1/06* (2006.01)
*F03D 7/02* (2006.01)
(Continued)

(52) U.S. Cl.
CPC ........ *F03D 11/0091* (2013.01); *F03D 1/0675* (2013.01); *F03D 13/20* (2016.05);
(Continued)

(58) Field of Classification Search
CPC .......... F03D 13/30; F03D 17/00; F03D 80/00; F05B 2230/608; F16M 11/06;
(Continued)

(56) References Cited

U.S. PATENT DOCUMENTS

| 6,375,369 B1 * | 4/2002 | Schneider | G03B 17/02 348/143 |
| 6,762,790 B1 * | 7/2004 | Matko | B60R 11/04 250/239 |

(Continued)

FOREIGN PATENT DOCUMENTS

| DE | 1785791 U | 3/1959 |
| DE | 3729102 A1 | 4/1988 |

(Continued)

OTHER PUBLICATIONS

International Search Report for PCT/EP2014/000737, ISA/EP, Rijswijk, dated Sep. 16, 2014. (In English and German).

*Primary Examiner* — Woody Lee, Jr.
*Assistant Examiner* — Brian O Peters
(74) *Attorney, Agent, or Firm* — Harness, Dickey & Pierce, P.L.C.

(57) ABSTRACT

The invention relates to a wind turbine having at least one measuring device for measuring deformations of an elongated component of the wind turbine, such as a tower or a rotor blade. The measuring device is part of a transmitting/receiving device with a remotely arranged reflector device, is mounted in a bracket, and has adjusting devices for precise adjustment and alignment of the measuring device relative to the bracket. The adjusting device has a cam rotation device at the bearing point of the adjusting device. The cam rotation device has, at every bearing point, a cam disc with an adjusting wheel, at least one ball disc with an associated ball socket and a clamping screw. The invention also relates to a method for adjusting and aligning a mea- (Continued)

suring device of the wind turbine, wherein the measuring device is aligned in the horizontal and vertical direction by rotating the cam rotation device.

8 Claims, 4 Drawing Sheets

(51) Int. Cl.
  *G03B 29/00* (2006.01)
  *F16M 11/14* (2006.01)
  *F03D 11/00* (2006.01)
  *F03D 80/00* (2016.01)
  *F03D 17/00* (2016.01)
  *F03D 13/20* (2016.01)

(52) U.S. Cl.
  CPC ............ *F03D 17/00* (2016.05); *F03D 80/00* (2016.05); *F05B 2230/608* (2013.01); *F05B 2240/50* (2013.01); *Y02E 10/721* (2013.01); *Y02P 70/523* (2015.11)

(58) Field of Classification Search
  CPC ........ F16M 11/08; F16M 11/10; F16M 11/12; F16M 11/125; F16M 11/126; F16M 11/128; F16M 11/14

USPC ....... 396/419, 427, 428; 348/143; 248/176.3
  See application file for complete search history.

(56) References Cited

U.S. PATENT DOCUMENTS

| | | | |
|---|---|---|---|
| 2011/0103933 A1* | 5/2011 | Olesen | G01B 11/16 415/118 |
| 2012/0120400 A1 | 5/2012 | Weigel et al. | |
| 2012/0132012 A1* | 5/2012 | Weigel | G01B 11/16 73/862.624 |
| 2013/0093879 A1* | 4/2013 | Bertolotti | F03D 1/06 348/125 |
| 2014/0003942 A1* | 1/2014 | Bertolotti | F03D 11/0091 416/61 |

FOREIGN PATENT DOCUMENTS

| | | |
|---|---|---|
| DE | 102010056033 A1 | 6/2012 |
| EP | 2453136 A1 | 5/2012 |

* cited by examiner

WIND TURBINE HAVING A MEASURING DEVICE

CROSS REFERENCE TO RELATED APPLICATIONS

This application is a U.S. National Phase Application under 35 U.S.C. 371 of International Application No. PCT/EP2014/000737 filed on Mar. 18, 2014 and published in German as WO 2014/173483 on Oct. 30, 2014. This application is based on and claims the benefit of priority from German Patent Application No. 102013007088.0 filed Apr. 24, 2013. The entire disclosures of all of the above applications are incorporated herein by reference.

FIELD

The invention relates to a wind turbine, and more particularly to a system and method for adjusting and aligning a measuring device of the wind turbine.

BACKGROUND

Measurement of the stresses and component deformations occurring during the operation of a wind turbine generally takes place using measuring devices, which are part of at least one transmitting/receiving device, and reflector devices arranged remotely from the transmitting/receiving device. The transmitting device sends signals to a reflector which are reflected and sent to the receiving device similarly arranged remotely from the reflector. In the receiver the reflected signals are evaluated and if necessary converted into measured values via a computing unit.

The measuring device may, for example, be what is referred to as a contactless remote measuring device in the form of a laser, a camera or similar arrangements.

The signals may be optical, sonar, laser or electromagnetic signals. The reflector is usually what is known as a retroreflector, arranged symmetrically about the respective axis at the installation point in the wind turbine, for example, the blade axis in a rotor blade or the tower axis in the tower.

The wind turbine unit may, by way of example, be a rotor with its protruding rotor blades, a nacelle—also referred to as a gondola—that is stationary relative to the rotor, or the turbine tower, at the top of which the gondola is mounted so that it can rotate relative to the tower. The measuring device can be arranged in an elongated cavity of the abovementioned component.

The spatial displacements of markings on the reflector surface caused by the aerodynamic loads can thus be detected and quantified by the measuring device.

For the precise determination of the aerodynamic loads, prior to the actual measurement, precise alignment and adjustment of an alignment face of the measuring device between the transmitting/receiving device and the reflector is required, in order to avoid influences of the measuring point and measuring range. The aim is that the useful measuring range in the measuring device corresponds to the deformations at the measuring point. The measuring device is therefore arranged in a bracket, secured on opposing sides in the cavity and having adjusting devices for accurate adjustment and alignment of the alignment face relative to the bracket. The bracket has to be adjustable to allow for adjustment of the measuring device during installation. Once alignment and adjustment are complete, the measuring device remains fixed relative to the alignment face of the associated reflector. All subsequent movements of the reflector are thus the result of the deformations resulting from the aerodynamic loads on the wind turbine component, which are to be measured.

EP 2 453 136 A shows an alignment and adjustment device for a measuring device in a cavity in a rotor of a wind turbine for measuring deformations, in particular of a rotor blade arranged on the rotor. The transmitting/receiving device of the measuring device is located in a housing, secured to a bracket in the cavity of the rotor, wherein the bracket takes the form of a distance plate with interspace supported at three points. Adjustment for each bearing position is via adjustable fixing bolts with the interpositioning of a compression spring. A lock screw sits in an additional screw hole of the distance plate and, following adjustment of the housing, is brought into contact with an alignment face, opposite the distance plate with interspace.

The disadvantage of the adjustment and alignment described above is that the adjustment of the bolts has to be performed separately for each bearing point and then precise positioning via the lock screw is required. Furthermore, the at least three bearing points must be arranged tangentially to one another. The adjustment and alignment of the measuring device is therefore fairly time-consuming and can lead to inaccuracies, so that measurement results based on such adjustment and alignment may be inaccurate or falsified.

DE 1785791 U discloses a tripod holder for a recording camera with a tripod head adjustable in various directions and an adjustable friction brake, the brake block of which can be applied by means of a rotatable cam disc.

SUMMARY

An object of the invention is to propose, for a wind turbine with a measuring device for measuring deformations of individual components of the turbine, a bracket for the measuring device, having an improved adjusting device for accurate adjustment and alignment of an alignment face of the measuring device relative to the bracket.

The solution to the problem in terms of the device is by means of the features set forth in the appended claims.

The wind turbine according to the invention has as the device for adjusting an alignment face of the measuring device relative to its bracket, a cam rotation device by means of which the measuring device is supported in the bracket and can be aligned or adjusted relative to the alignment face. The cam rotation device comprises at the bearing point a control disc mounted on a shaft, the mid-point of which lies outside of the shaft axis, wherein the rotational movement is converted into a translational movement for adjustment of the measuring device. The rotation of the cam device at its bearing points in the same and/or in respective opposite directions thus means that the bracket and consequently the measuring device can be aligned precisely in the desired vertical and horizontal planes.

Compared with the prior art three-point bearing with direct translational adjustment by means of fixing bolts, compression spring and lock screws, this simultaneous horizontal and vertical distance adjusting device is easier to work with. The measuring device can thus be adjusted more precisely and accurately in advance for measurement of deformations of a component of the wind turbine.

The cam rotation device has a cam disc with an adjusting wheel, at least one ball disc with associated ball socket and a clamping screw, wherein advantageously in front of and behind each bearing point a ball disc and ball socket pairing is provided. When clamping elements have to adapt to non-parallel surfaces, vertical and horizontal adjustment takes place by means of the ball discs or ball sockets arrangement at each bearing point. Once the measuring device is positioned in the vertical and horizontal plane, the cam discs are secured against rotation. This can be achieved, for example, by threaded pins arranged on the housing. The cam disc is designed at its bearing point as an adjusting wheel with a degree or other suitable marking, allowing a predefined or pre-calculated position of the measuring device to be set manually or also by remote control.

The measuring device is enclosed by a housing which forms part of the alignment face of the measuring device. The bracket is secured in a stationary position at the installation point of the component of the wind turbine. Only the measuring device with housing is moved by means of the cam rotation devices arranged at the bearing points in the vertical and/or horizontal direction.

The housing design is adapted to the operating site of the measuring device. The housing is supported in the longitudinal direction by means of the opposing mounting flanges arranged on the bracket, which are preferably arranged on both sides of the bracket. The housing preferably also accommodates the transmitting/receiving device of the measuring device. This dispenses with an additional adjustment and alignment device for the transmitter or the receiver. The bracket can take any form, e.g. that of a plate with mounting flanges arranged at each bearing point transversally to the alignment face and that of a bearing point with the individual parts of the cam rotation device.

On further mounting flanges of the bracket, transversal to the bearing device and preferably opposite each other, further adjusting devices can be arranged, resulting in improved positional stability of the measuring device. For this adjusting mechanism, however, there is no need for a cam rotation device. The adjusting device here comprises an adjusting screw with a lock nut. The alignment face of the measuring device can thus be roughly pre-adjusted in its vertical position. Following adjustment and alignment by the cam rotation device at the bearing points the definitive position is then secured and protected from vibration by tightening the lock nuts.

The bracket can be designed with the mounting flanges as a plate. In a particularly advantageous further development of the invention, however, the bracket has a cutout, opposite the alignment face, wherein the rear of the measuring device can penetrate the cutout in full or in part. As a result of the frame-like arrangement, the electrical supply and control lines arranged on the rear can be connected without interfering with the alignment face. Furthermore, through this measure the alignment and adjusting range of the measuring device is increased.

The measuring device for measuring deformations of an elongated component of the wind turbine is preferably arranged in the cavity of one or more rotor blades of the turbine and is known as a blade sensor. By means of the measuring device, therefore, blade deformations of rotor blades arranged transversally to the rotor axis or deflection of the rotor can be detected. Furthermore, the measured deformations are an indicator of the aerodynamic loads on the wind turbine. If the measuring device is arranged in the cavity of the tower, then tower oscillations and the effects on the rotor loading of the system during operation can be evaluated.

The measuring device is advantageously designed as an optical measuring device, wherein the adjustment and alignment of the transmitting device take place by means of a reflector device at the receiver device and the transmitter/receiver device is designed as a camera. The receiver contains at least one imaging optic, which creates an image of the reflector device on the receiver or a sensor. Following the alignment and adjustment according to the invention of the camera position, the deviations in the reflector image can be interpreted as a flexure of the rotor blade.

Further aspects of the invention, advantages and features are apparent from the dependent claims for the device and the method, and also from the drawings and the associated description.

BRIEF DESCRIPTION OF DRAWINGS

The invention is explained in more detail in the following by means of an embodiment.

FIG. 7 shows a side view of FIG. 4.

DETAILED DESCRIPTION

Figure 1:
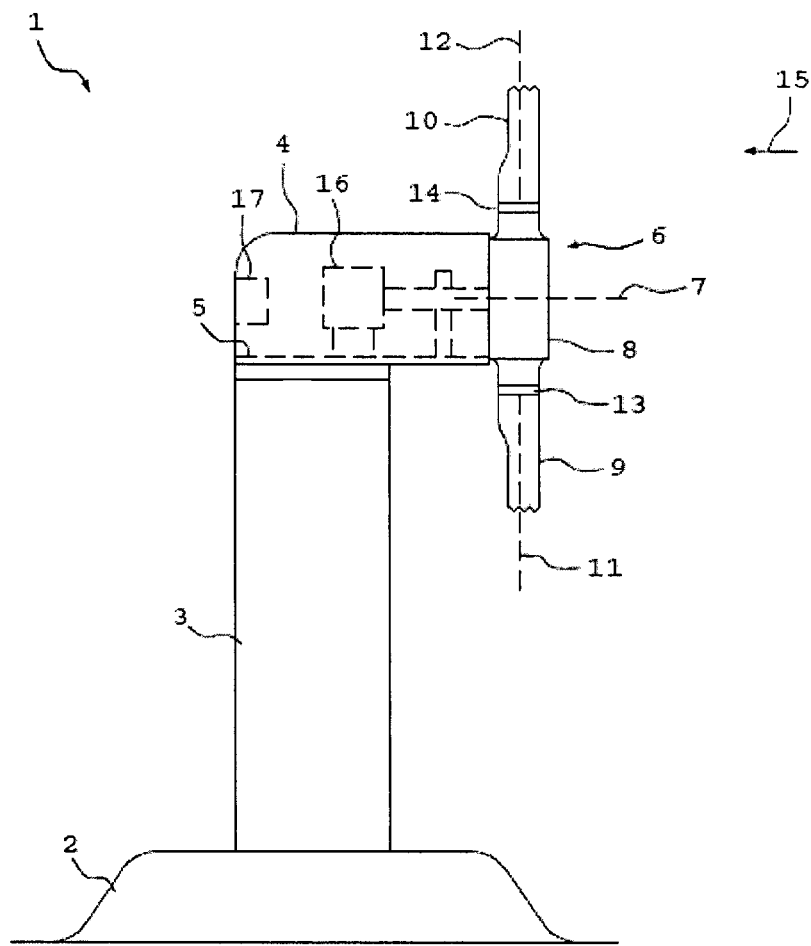
FIG. 1 is a schematic view of a wind turbine.

FIG. 1 shows a wind turbine 1, wherein a tower 3 standing on a foundation 2 at its end turned away from the foundation 2 is connected with a nacelle 4. In the nacelle 4 a machine support 5 is arranged, on which a rotor 6 is supported so that it can rotate about a rotor axis 7, and which has a rotor hub 8 and rotor blades 9 and 10 connected to this, and which in each case can be rotated about their blade axes 11, 12 relative to the rotor hub 8. Each rotor blade 9, 10 is mechanically coupled to an adjusting drive 13, 14, by means of which the respective rotor blade 9, 10 is rotated about the associated blade axis 11, 12 and mechanically coupled to an electric generator 16, arranged in the nacelle 4 and secured to the machine support 5, and which converts the wind power 15 acting on the individual rotor blades mostly into electrical energy. For the controlled operation of the wind turbine 1 a higher-level turbine controller 17 is provided, by means of which, inter alia, the adjusting drives 13, and 14 are controlled.

Figure 2:
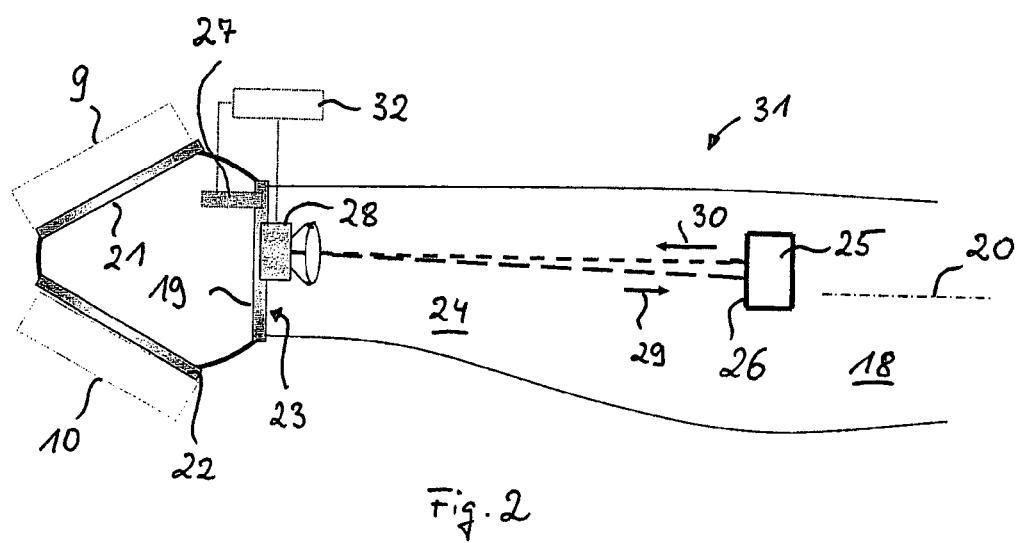
FIG. 2 is a general schematic and partial representation of a rotor of the wind turbine from FIG. 1 with a measuring device arranged in a rotor blade.

FIG. 2 shows a schematic and partial representation of the rotor 6 in the line of sight of FIG. 1, wherein on the rotor hub 8 a third rotor blade 18 is supported by a blade bearing 19 so that it can rotate. The rotor blades 9 and 10 similarly have blade bearings 21 and 22, as can be seen from FIG. 2. In FIG. 1 the rotor blade 18 is concealed by the rotor hub 8. Like the rotor blades 9 and 10 the rotor blade 18 is also mechanically coupled to a schematically suggested blade angle adjusting drive 27, and by means of this is able to rotate about the blade axis 20.

FIG. 2 further shows a measuring arrangement 31 for measuring the deformation of a rotor blade of the wind turbine 1, which is integrated in full or in part in the rotor 6. By means of the arrangement 31 an aerodynamic loading of the rotor blade 18 is measured. The end of the rotor blade 18 secured to the blade bearing 19 is referred to as the blade root 23.

The measuring arrangement 31 works on the basis of an optical system and comprises a measuring device 28 in the form of a camera, which as a combined transmitting/receiving device sends light signals 29, 30 to a reflector 25 arranged in a cavity 24 of the rotor blade 18 which, at a distance from the blade root 23, receives the incoming signals from the camera 28, reflects them to its surface 26 turned towards the incoming signal and then sends them back to the camera 28. The beams 29 (signals) generated by the light source generate on the reflector 25 a light marking, which through the blade deformation displaces spatially on the reflector surface 26. The displaced marking is recorded in the camera 28 via the reflected light beam 30. The data on the deformation are transmitted to a computing and signal processing device 32 connected with the camera 28 and converted into measured variables which are used as control variables for the adjusting drive 27 and via a link (not shown) with the wind turbine controller 17 for other operating parameters.

The camera 28 is arranged in the area of the blade bearing 19 and has a fixed point of reference to the blade root 23. This prevents possible camera movements during the measurement process impacting on the result. The signal impinging on the reflector 25 generates a marking on the surface 26 of this. As a result of the aerodynamic load the blade 18 is deformed, wherein the deformation results in a displacement of the marking on the reflector surface 26. This displacement is recorded in the measuring device 28.

Figure 3:
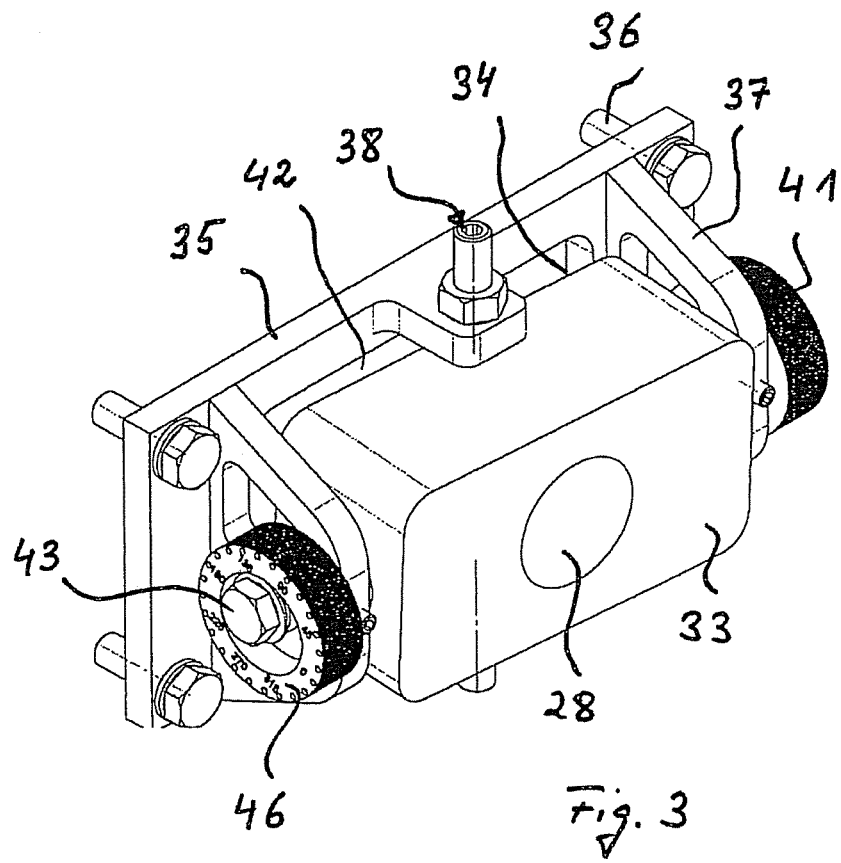
FIG. 3 shows the measuring device according to FIG. 2 in perspective view.

Details of the measuring device or camera 28 are described in the following using FIG. 3 onwards. For greater protection, the camera 28 is arranged in a housing 33 with an alignment face 34 aligned in the direction of the reflector 25. The housing 33 further has a bracket 35, which by means, for example, of fixing screws 36 or otherwise, is rigidly connected in the cavity 24 of the rotor blade 18 with the blade root 23.

The camera 28 is supported in the longitudinal direction in the two opposing mounting flanges 37 arranged on the bracket 35, protruding on both faces of the bracket 35 in the direction of the reflector 25. Transversal to the bearing direction and also opposing each other two additional adjusting devices 38 are arranged with adjusting screws 39 and lock nuts 40. By means of this arrangement, the alignment face of the camera 28 can be roughly pre-set in its vertical position.

Prior to the actual measurement of the deformation of the rotor blade 18, caused by aerodynamic influences, a precise alignment and adjustment of the camera 28 relative to the bracket 35 is required. The bracket needs to be adjustable to allow for adjustments of the camera 28 during installation. Once alignment and adjustment are complete it remains fixed relative to the alignment face of the associated reflector. All subsequent movements of the reflector 25 are thus a consequence of the deformations due to the aerodynamic loads on the component of the turbine, which are to be measured.

Figure 6:
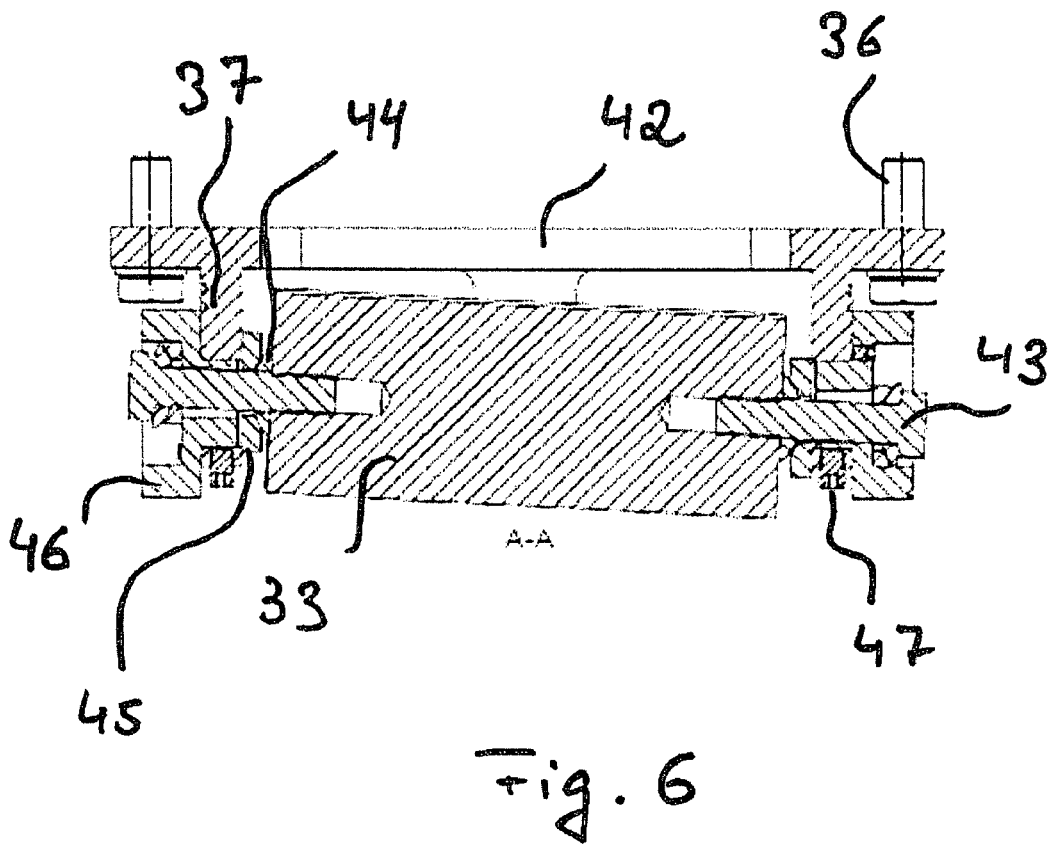
FIG. 6 shows a sectional view from FIG. 4 along the line A-A.
Figure 17:
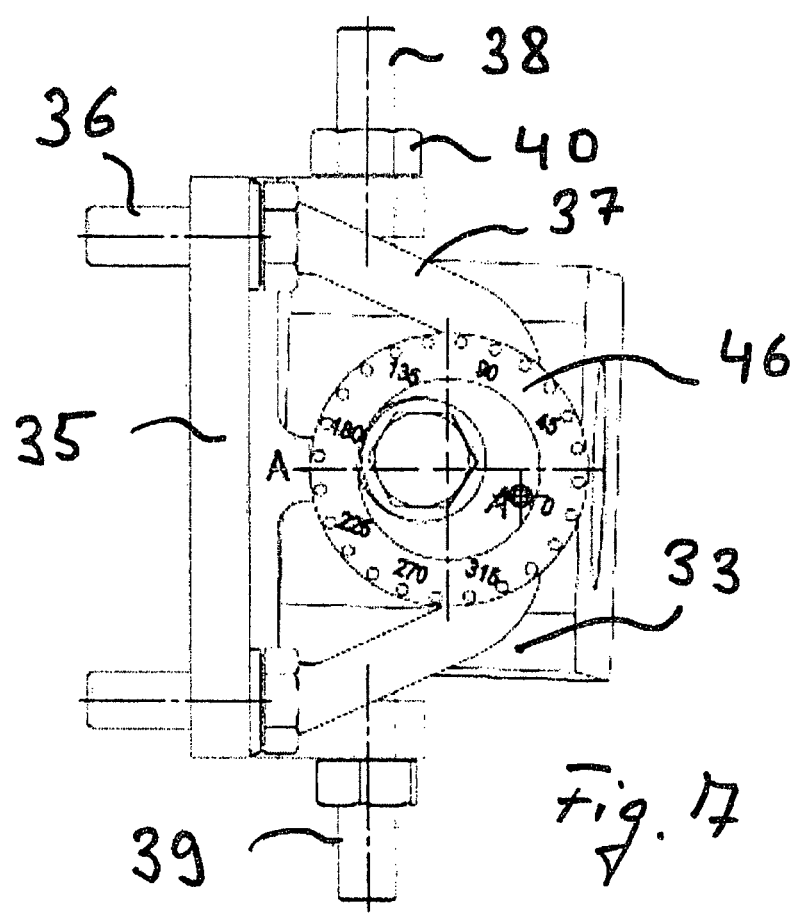

According to the invention the camera 28 can be aligned and adjusted by means of a cam rotation device 41 at both bearing points of the camera housing 33 with the bracket. By rotating the cam rotation device 41, therefore, the alignment face 34 of the camera 28 can be adjusted relative to the stationary bracket 35 in all directions, as shown in FIGS. 6 and 7. Following adjustment and alignment by the cam rotation device 41 at the bearing points the definitive position is then secured and protected from vibration by tightening the lock nuts.

The bracket 35 is not designed as a plate, but has a cutout 42, opposing the alignment face 34. The dimensions of the cutout 42 are designed to ensure that the rear of the housing 33 can penetrate the cutout 42 in full or in part. As a result of the frame-like arrangement of the housing, the electrical supply and control lines arranged on the rear of the camera 28 can be connected without interfering with the alignment face 34.

Figure 4:
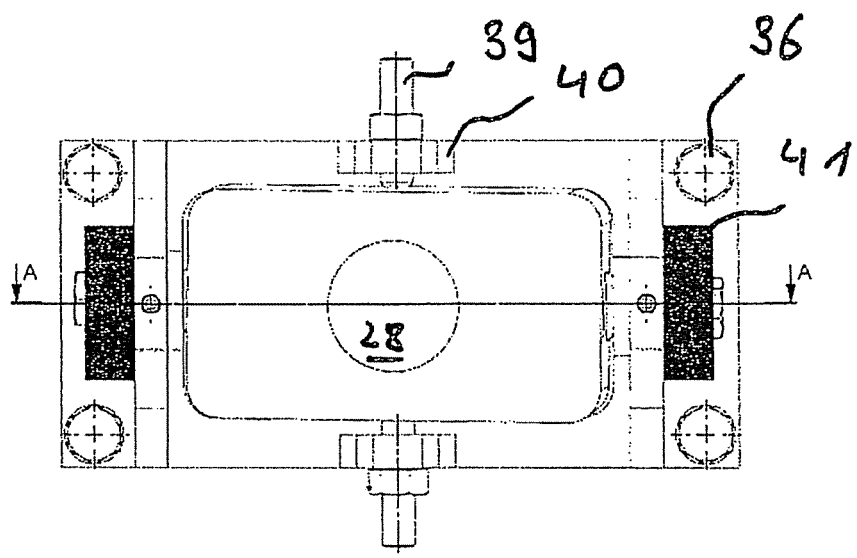
FIG. 4 shows a front view of the arrangement according to FIG. 2.

FIG. 4 shows a front view of the arrangement from FIG. 2, comprising camera 28, housing 33 and bracket 35 with the two laterally arranged cam rotation devices 41 at the bearing points and the opposing adjusting devices 38 arranged transversally with the adjusting screws 39 and the lock nuts 40.

Figure 5:
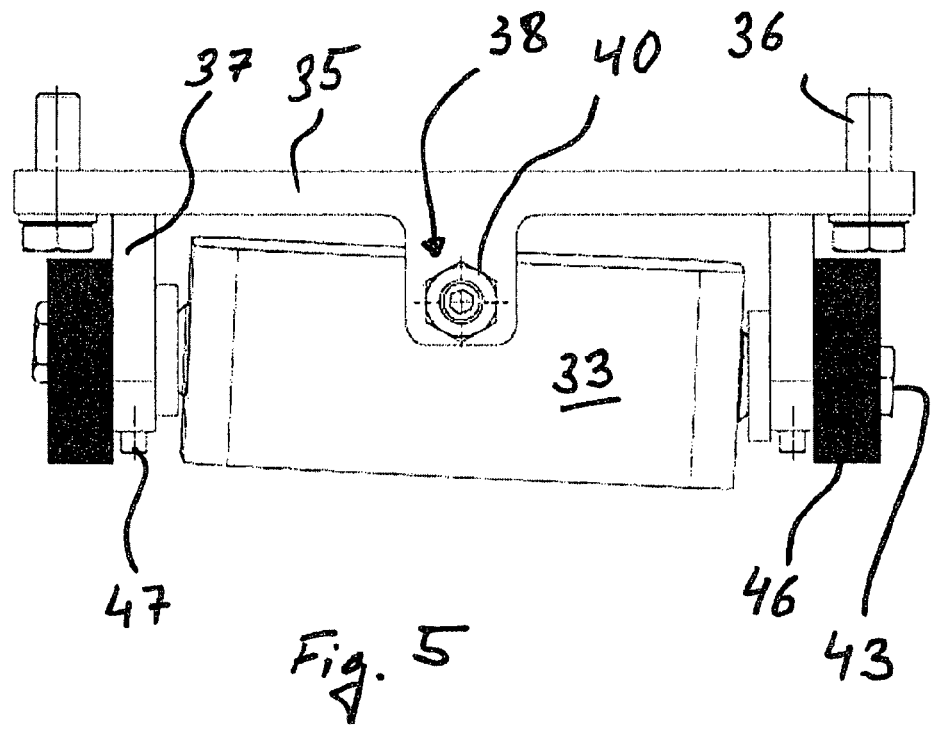
FIG. 5 shows a top view of the arrangement according to FIG. 2.

The cam device adjusting mechanism and the structure of the device 41 can be seen in FIGS. 5 and 6. FIG. 5 shows a top view of the arrangement according to FIG. 2. This representation shows the possibility for adjustment by means of the cam rotation device 41 in the vertical plane.

FIG. 6 shows in a sectional view A-A of FIG. 4 the possibility for adjustment of the camera 28 in the horizontal. FIG. 7 shows a side view of FIG. 2. At each bearing point, the cam rotation device 41 has a cam disc 46 designed as an adjusting wheel, which is connected by means of a clamping screw 43 with the lateral mounting flanges 37 of the bracket 35. In front of and behind each bearing point a ball disc and ball socket pairing is provided, wherein a ball disc with reference 44 and the associated ball socket with reference 45 is provided. The position set by rotation of the cam discs 46, of the ball disc 44 relative to the ball socket 45, is secured by a locking screw 47 designed as a threaded pin, arranged transversally to the clamping screw 43.

As a result of the arrangement of the cam rotation device, by rotating the two cam discs 46 in the same or opposite direction, the camera 28 is aligned both horizontally and vertically. Following horizontal and vertical alignment of the camera 28, both cam discs 46 are secured against rotation by the two locking screws 47. On the two opposing adjusting devices 38, by rotating the two adjusting screws, the camera 28 is set in the horizontal direction and by means of the lock nuts 40 secured against rotation. If the camera 28 is correctly set, both clamping screws 43 on the cam rotation device are tightened. In addition, the two cam discs 46 can further be secured against rotation by two locking screws 47.

KEY

1 Wind turbine
2 Foundation
3 Tower
4 Nacelle
5 Machine support
6 Rotor
7 Rotor axis
8 Rotor hub
9 Rotor blade
10 Rotor blade
11 Blade axis
12 Blade axis
13 Blade angle adjusting drive
14 Blade angle adjusting drive
15 Wind power
16 Generator
17 Wind turbine controller
18 Rotor blade
19 Blade bearing
20 Blade axis
21 Blade bearing
22 Blade bearing
23 Blade root 24 Cavity
25 Reflector
26 Surface
27 Blade axle adjusting drive
28 Measuring device, camera
29 Signal path
30 Signal path
31 Measuring arrangement
32 Signal processing unit
33 Housing
34 Locating face
35 Bracket
36 Fixing screw
37 Mounting flange
38 Adjustment device
39 Adjusting screw
40 Lock nut
41 Cam rotation device
42 Cutout
43 Clamping screw
44 Ball disc
45 Ball socket
46 Cam disc
47 Locking screw

The invention claimed is:

1. A wind turbine with a rotor, comprising at least one rotor blade extending perpendicularly to a rotor axis, a nacelle that is stationary relative to the rotor, supported by a tower, and with at least one measuring arrangement for measuring deformations of one or more elongated components of the wind turbine, wherein the at least one measuring arrangement comprising:
a camera enclosed in a housing, a reflector arranged remotely from said camera, wherein the camera and reflector are arranged in a cavity within the one or more elongated components of the wind turbine, wherein the camera and housing are mounted in a bracket and the reflector is secured on an opposite side of the cavity, and
the at least one measuring arrangement further comprising:
adjusting devices for precise adjustment and alignment of an alignment face of the housing relative to the bracket; and each of the adjusting devices has a cam rotation device at its bearing point which supports the camera and housing to the bracket, and by rotating each said cam rotation device the alignment face is aligned and adjusted relative to the bracket, wherein each said cam rotation device has, at its associated bearing point, a cam disc with an adjusting wheel, at least one ball disc with an associated ball socket and a clamping screw, and the housing is mounted in the longitudinal direction on a pair of parallel facing mounting flanges of the bracket.

2. The wind turbine according to claim 1, wherein the bracket is arranged in a stationary manner at an installation point of the at least one elongated component of wind turbine and the camera and housing can be set and adjusted relative to the bracket in the horizontal and/or vertical direction.

3. The wind turbine according to claim 1, further comprising an adjusting screw with a lock nut.

4. The wind turbine according to claim 1, wherein the bracket has a cutout, opposite the alignment face, and which the alignment face can penetrate into the cutout in full or in part.

5. The wind turbine according to claim 1, wherein the elongated component of the wind turbine is the at least one rotor blade and/or the tower.

6. A method for forming a wind turbine, comprising:
providing the wind turbine having a rotor including at least one rotor blade extending perpendicularly to a rotor axis;
providing the wind turbine with a nacelle that is stationary relative to the rotor, supporting the nacelle with a tower;
placing within one of the elongated components of the wind turbine a transmitting/receiving device including a camera and a reflector arranged in a cavity of the one or more elongated components of the wind turbine, wherein the placing of the transmitting/receiving device further comprises;
arranging the reflector remotely from said camera, mounting the camera in a housing using a bracket secured on opposite sides of the housing;
using adjusting devices for precise adjustment and alignment of an alignment face of the housing relative to the bracket; and
configuring each of the adjusting devices to include a cam rotation device at a bearing point thereof, which supports the housing to the bracket, and such that rotating at least one of the cam rotation devices causes the alignment face to be moved to facilitate alignment and adjustment of the camera;
further configuring the cam rotation devices such that each has, at its associated bearing point, a cam disc with an adjusting wheel, at least one ball disc with an associated ball socket and a clamping screw, and mounting the housing longitudinally on a pair of parallel facing mounting flanges of the bracket.

7. The method according to claim 6, wherein following alignment the cam discs are secured against rotation by means of the clamping screws.

8. The method according to claim 6, wherein by rotating the two adjusting screws on the adjusting devices the measuring arrangement is set in the vertical direction and is secured by lock nuts.

* * * * *